L. V. GRILLET & J. B. TRUCHETET.
DYNAMO ELECTRIC MACHINERY.
APPLICATION FILED JAN. 9, 1914.
1,138,286.
Patented May 4, 1915.
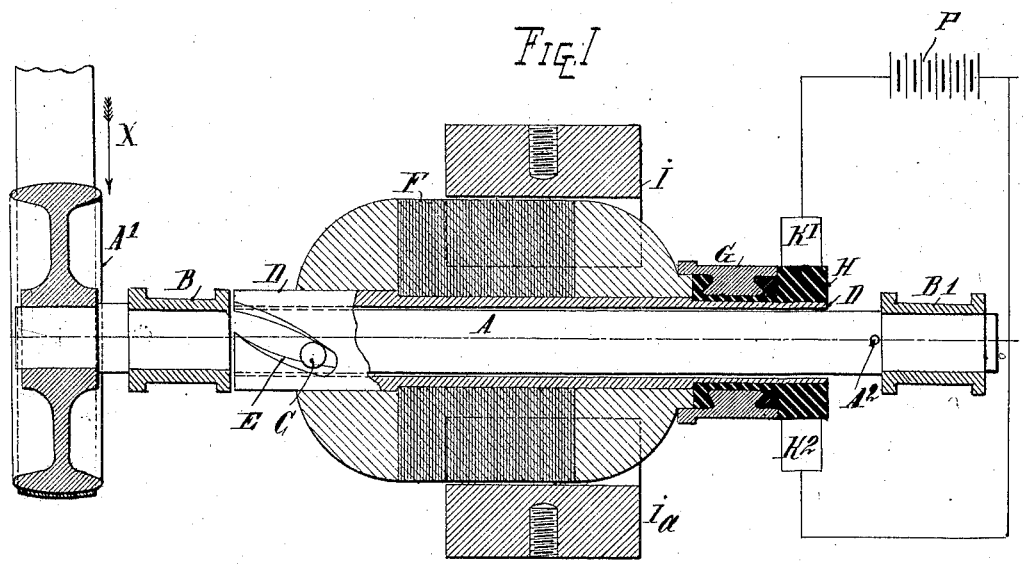
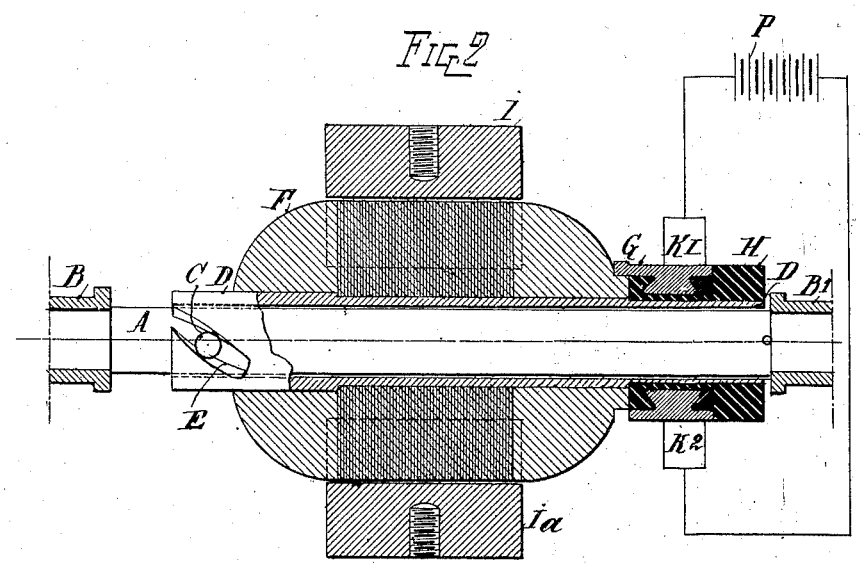

UNITED STATES PATENT OFFICE.

LEON VICTOR GRILLET AND JEAN BAPTISTE TRUCHETET, OF PARIS, FRANCE.

DYNAMO-ELECTRIC MACHINERY.

1,138,286. Specification of Letters Patent. Patented May 4, 1915.

Original application filed October 18, 1911, Serial No. 655,325. Divided and this application filed January 9, 1914. Serial No. 811,234.

*To all whom it may concern:*

Be it known that we, LEON VICTOR GRILLET and JEAN BAPTISTE TRUCHETET, both citizens of the French Republic, residing at 61 Rue de Bretagne, Paris, in the Department of Seine, France, have invented new and useful Dynamo-Electric Machinery, of which the following is a specification.

The subject matter of the present invention is matter divided from our application Serial No. 655,325 dated the 18th October 1911, of which it originally formed a part.

The invention relates to automatic regulating devices and is particularly applicable to sets comprising dynamo electric machines and batteries of secondary cells.

The principle of the present invention is to replace and perform the same functions as the complicated controlling making and breaking switches hitherto in use.

Broadly the invention comprises a dynamo electric machine, the armature of which is axially-movable, which axial movement is made use of for breaking the charging circuit when circumstances render this latter desirable.

More particularly defined, the present invention comprises a dynamo electric machine having an armature capable of being displaced upon its shaft relatively to the fixed field magnets, this displacement determining when the external circuit shall be broken by causing the brushes to become insulated. The present invention may be employed either to join the dynamo to the external circuit or to the battery, or to disconnect it from the external circuit when the voltage generated by the dynamo falls below that of the battery. According to this invention then, the commutator which slides axially in company with the armature is formed of the usual conducting segments and also with an insulating ring which moves under the brushes to render them inoperative at desirable periods. The present invention is more particularly applicable to the charging of secondary batteries and for use as lighting sets for motor cars, railway trains and the like.

One embodiment of the present invention is illustrated in the accompanying drawings, in which—

Figure 1 shows diagrammatically in section a dynamo electric generator according to this invention with the driving pulley and belt and the charging circuit, the whole being shown in the "off" position, and Fig. 2 is a diagrammatic view corresponding to Fig. 1, in which the apparatus is in the "on" position.

Referring to the drawings, the dynamo shown as an example is a bi-polar machine with shunt excitation. The driving shaft A rotates in the bearings B and B' and carries a driving pulley A'. A peg or pin C passes through the driving shaft A and serves after the manner of the driver of a lathe. This driver engages in helical grooves E or recesses cut in the thickness of a sleeve D mounted freely upon the shaft A. This sleeve is of sufficient length to receive the armature F of the dynamo, the commutator G, and an insulating ring H. The field windings or field poles of the dynamo are shown at I, I$^a$, while the brushes are seen at K', K$^2$ and the battery of secondary cells at P.

As mentioned above, when the driving shaft A is at rest the various members take up the position shown in Fig. 1. When the driving shaft rotates in the direction shown by the arrow X it follows that the movable sleeve D is displaced upon the shaft A (Fig. 2) in such a way that the commutator G comes into contact with the brushes and so closes the charging circuit and insures that the secondary cells P will be charged by the dynamo. The sleeve D is first displaced owing to the rotating effect of the shaft because the driver C pushes upon the helical groove E. Afterward the armature slides under the influence of the electro-magnetic attraction between it and the field magnets I and I$^a$. The displacement of the sleeve D is limited by means of a stop such as a pin A$^2$ fixed to the shaft A. Instead of this pin a spring stop of the nature of a buffer might be used.

When the battery of secondary cells P is being charged by the dynamo (as is seen in Fig. 2), if the voltage of the dynamo descends below that of the battery or if the dynamo stops, current from the battery flows back into the dynamo, transforms it into a motor and the armature F dragging back the sleeve D causes it to slide upon the shaft A by a sort of screwing action between the driver C and helical grooves E. The arrangement therefore returns to the position shown in Fig. 1, that is to say, the insulating ring H is interposed beneath the brushes K', K², so that the charging circuit is again broken.

What we claim is:

1. In an electrical generator, the combination of a field structure, an armature, a shaft, a sleeve mounted loosely on said shaft, a commutator carried by said sleeve, brushes on said commutator but insulated therefrom on axial movement of said commutator and a driving connection between said shaft and said sleeve causing relative axial movement between the two.

2. In an electrical generator, the combination of a field structure, a shaft, a sleeve mounted loosely on said shaft, an armature carried by said sleeve, a commutator carried by said sleeve, brushes on said commutator, an external circuit connected to said generator, a driving connection between said shaft and said sleeve causing relative axial motion between the two and means operated by this motion to change the connections between the external circuit and the generator.

3. In an electrical generator the combination of a field structure, a shaft, a sleeve mounted loosely on said shaft formed with a helical groove at one end, a driving pin fixed to said shaft and engaging in the groove to drive said sleeve and to move it axially, an armature carried by said sleeve, a commutator carried by said sleeve, and brushes contacting with said commutator but insulated therefrom upon the axial movement of the commutator with said sleeve.

4. In an electrical generating system, the combination of a field structure, a shaft, an armature slidable upon said shaft, a commutator integral with said armature, an insulating ring integral with said commutator, brushes in contact with said commutator but contacting with said insulating ring upon axial movement of the commutator, a driving connection between said shaft and said armature causing the latter to slide upon said shaft, a secondary battery, electrical connections between said brushes and said battery, and means for insulating said brushes when the voltage of said battery exceeds that generated by said armature.

In testimony whereof we have signed our names to this specification in the presence of two subscribing witnesses.

LEON VICTOR GRILLET.
JEAN BAPTISTE TRUCHETET.

Witnesses:
  PAUL CAGUET,
  HANSON C. COXE.